Feb. 9, 1971  F. L. MEURET  3,561,823
METERING AND SEPARATING MEANS FOR A CONVEYER SYSTEM
Filed July 31, 1968  2 Sheets-Sheet 1

Forrest L. Meuret
INVENTOR
BY
Kolisch + Hartwell
Attys.

Feb. 9, 1971        F. L. MEURET        3,561,823
METERING AND SEPARATING MEANS FOR A CONVEYER SYSTEM
Filed July 31, 1968        2 Sheets-Sheet 2
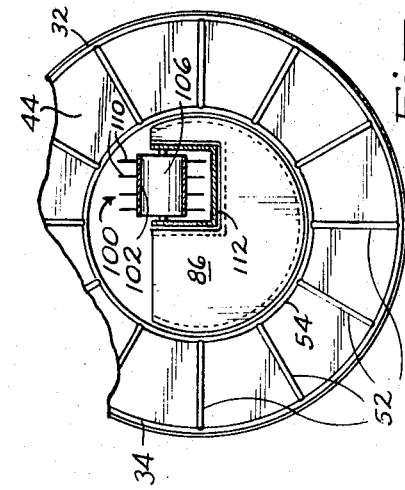
Fig. 6.
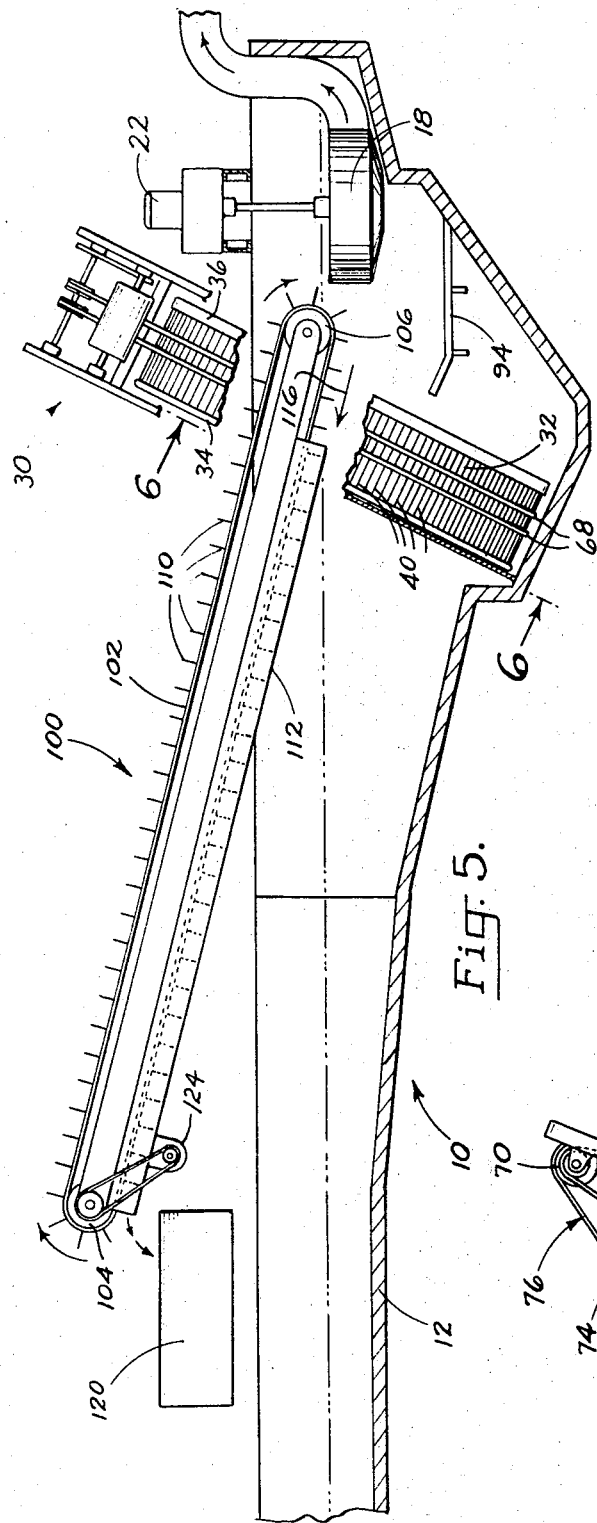
Fig. 5.
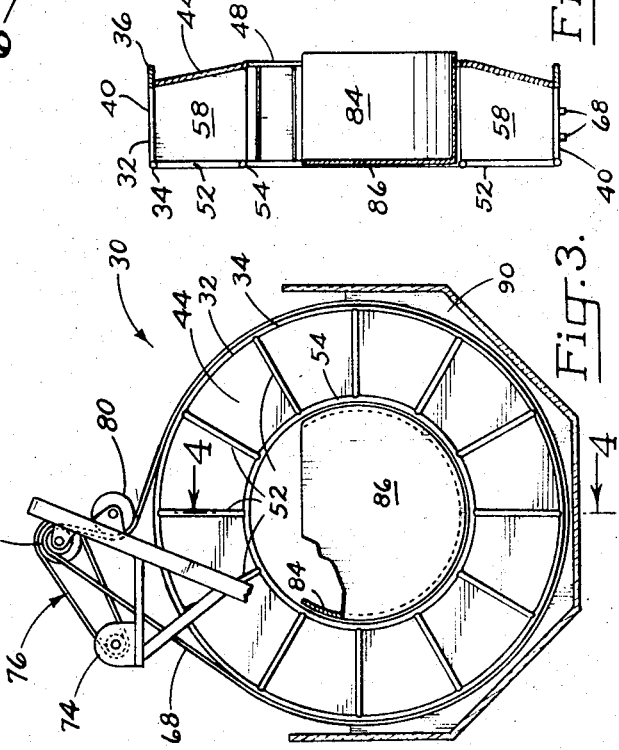
Fig. 4.
Fig. 3.
Forrest L. Meuret
INVENTOR
BY
Kolisch + Hartwell
Attys.

United States Patent Office 3,561,823
Patented Feb. 9, 1971

3,561,823
METERING AND SEPARATING MEANS FOR A CONVEYER SYSTEM
Forrest L. Meuret, Rte. 1, Box 224,
Madras, Oreg. 97741
Filed July 31, 1968, Ser. No. 749,031
Int. Cl. B01d 33/02; B65g 29/00, 53/30
U.S. Cl. 302—14                          7 Claims

ABSTRACT OF THE DISCLOSURE

Metering means for regulating the flow of articles moved along a flow path in a conveyer system including a rotatable open-centered wheel set transversely of the flow path and tilted downstream. The wheel has pockets disposed about its open center which open toward the upstream side and toward the center of the wheel. A motor is provided for rotating the wheel. An arcuate shroud set within the center of the wheel closes off the center opening of each pocket as it is moved through an arc beneath the center of the wheel. A plate extending across the upstream end of the shroud prevents articles from being moved directly through the center of the wheel. A power-operated endless conveyer having fingers projecting outwardly therefrom separates articles in the system.

---

This invention relates to metering means for regulating the rate of flow of articles moved along a flow path in a conveyer system.

A general object of the invention is to provide in a conveyer system novel metering means which is adapted to receive an irregular flow of articles moved by the system at its upstream side and discharge a regulated flow of such articles from its downstream side.

Another object of the invention is to provide such novel metering means in a conveyer system which will regulate the flow of articles moved by the system with minimum damage to the articles conveyed.

More specifically, an object is to provide a novel rotatable open-centered wheel set transversely of the flow path in the conveyer system and tilted downstream, with the wheel having pockets which open to the upstream side of the wheel for receiving articles moved to its upstream side and openings toward the center of the wheel for discharging articles at a regulated rate from the pockets to a region downstream from the wheel.

Yet another object is to provide in such metering means novel baffle means and stop means set within the center of the wheel for preventing articles moved by the system from being moved directly through the center of the wheel and for assuring that such articles are received by the pockets in the wheel and discharged from the center openings of the pockets at predetermined intervals.

Still another object is to provide novel metering means for use in a conveyer system wherein articles are moved in a liquid with the metering means being adapted to separate such articles from the conveying liquid.

Yet another object is to provide, in a conveyer system in which two types of articles are moved simultaneously in a liquid with one type article submerged and another type floating on the surface of the liquid, novel separating means for skimming the floating articles from the surface of the liquid.

These and other objects and advantages will become more fully apparent as the following description is read in conjunction with the accompanying drawings, wherein:

FIG. 3 is a view of the upstream face of the metering means taken generally along the line 3—3 in FIG. 2;

FIG. 4 is a cross-sectional view taken generally along the line 4—4 in FIG. 3 with a portion of the mechanism of the metering means omitted to simplify the drawing;

Figure 2:
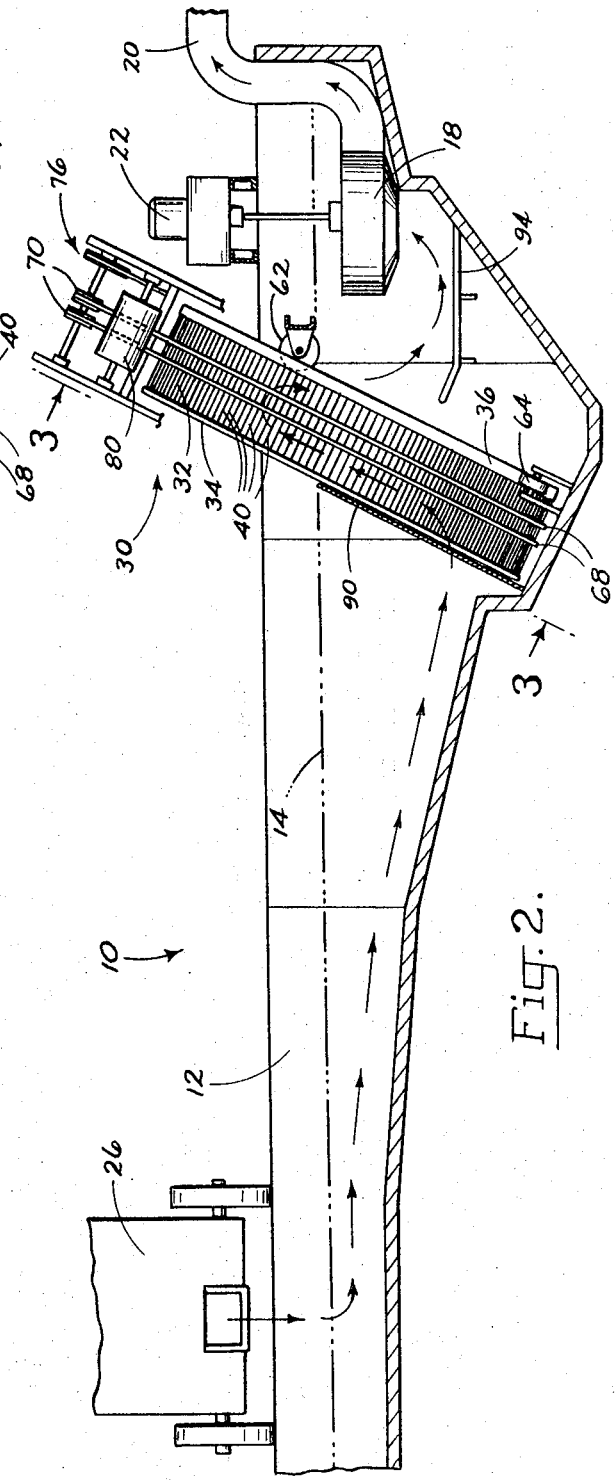
FIG. 2 is a side elevation view of the conveyer system and metering means illustrated in FIG. 1.

FIG. 5 is a side elevation view of a conveyer system and metering means similar to that illustrated in FIG. 2, with the addition of a separating conveyer extending at an angle through the metering means in the system; and FIG. 6 is a view taken generally along the line 6—6 in FIG. 5 illustrating a portion of the upstream face of the metering means with the separating conveyer extending therethrough.

Figure 1:
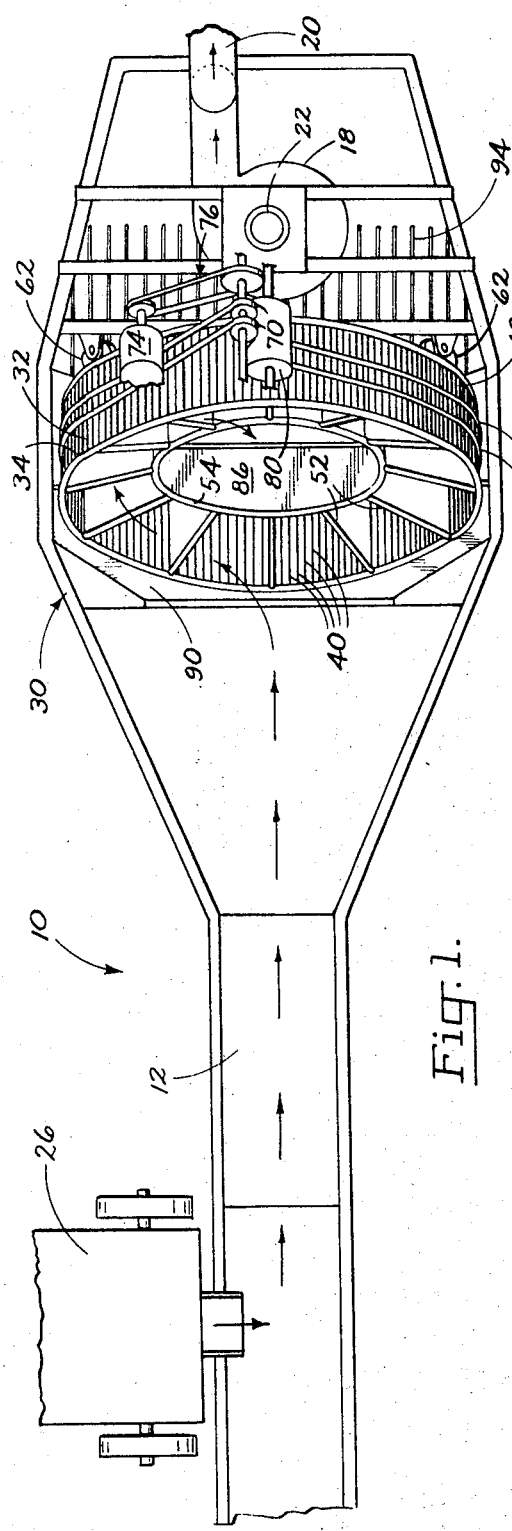
FIG. 1 is a top plan view of a portion of a conveyer system with metering means constructed in accordance with an embodiment of the invention set therein.

Referring now to the drawings, and first more specifically to FIGS. 1 and 2, at 10 is indicated generally a conveyer system for moving articles along a flow path to the right in FIGS. 1 and 2. The conveyer system includes a flume defining a channel 12 within which a liquid such as water, the surface of which is indicated at 14, may flow to carry articles along a flow path in the system. The system further includes a pump indicated generally at 18 for drawing articles and water from the flume and pumping them upwardly and away from the flume through a discharge pipe 20. A motor 22 mounted above the flume provides driving power for pump 18.

Such a conveyer system is well suited for transporting articles such as vegetables since the water in the system provides a cushion between adjacent vegetables flowing in the system. To illustrate, vegetables, such as potatoes, dumped into flume 12 from a truck 26, are carried by the water in the system to the right in FIGS. 1 and 2 and into the intake side of pump 18. The pump, in turn, causes the vegetables to be moved to a station farther downstream in the system. The flow of vegetables from trucks such as that indicated at 26 would be irregular. If the flow rate of vegetables in such a system is not regulated the pump possibly will become clogged, whereby it can no longer provide a water cushion between adjacent vegetables and damage will occur to the vegetables conveyed by the system.

Metering means, indicated generally at 30, is provided in the system to regulate the rate of flow of articles conveyed by the system. The metering means includes a wheel 32 supported in flume 12 transversely of the flow path with its axis of rotation tilted from the horizontal to position the top of the wheel farther downstream than its bottom. Referring to FIGS. 1 through 4, the peripheral portion of wheel 32 includes a pipe ring 34 at the upstream side of the wheel, an annular band 36 at the downstream side of the wheel, and multiple circumferentially spaced-apart rods 40 paralleling the axis of rotation of the wheel and extending between and being joined at their opposite sets of ends to pipe ring 34 and annular ring 36, respectively. The pipe ring, annular band and rods comprise what is collectively referred to herein as a cage structure, with the openings provided between rods 40 being smaller than the cross-sectional dimensions of articles to be conveyed through the system.

The downstream side of wheel 32 is partially enclosed by a circular plate 44 which is set within band 36, is secured along its circumference to band 36, and has a circular hole defined through its center portion indicated at 48 (see FIGS. 3 and 4). As will be seen in FIG. 4, plate 44 is conical and provides a beveled surface which slopes in a downstream direction on progressing from the circumference of the plate toward the center of the plate.

At the upstream side of wheel 32 a series of radially disposed pipe members 52 are secured at their one set of ends at circumferentially spaced apart points to pipe ring 34 and project radially inwardly therefrom. A second pipe ring 54 is secured to the set of ends of pipe members 52 adjacent the center of the wheel. As is best illustrated in FIG. 4, pipe ring 54 has an inside diameter which is substantially the same as the diameter of hole 48 defined through plate 44.

A series of circumferentially spaced-apart divider plates 58, each having the trapezoidal configuration illustrated in FIG. 4, are radially disposed about the wheel, paralleling the central axis of the wheel, with each divider plate being secured along its upstream edge to one of pipe members 52 and along its downstream edge to back plate 44. Multiple pockets thereby are defined within the wheel, with each pocket being bounded on the periphery of the wheel by rods 40, on the downstream side of the wheel by plate 44 and on either side by plates 58. Each pocket has an upstream opening framed by a portion of pipe ring 32, a portion of pipe ring 54, and a pair of pipe members 52, and a center opening toward the center of the wheel framed by a portion of pipe ring 54, the radially inward edges of a pair of spaced divider plates 58 and a portion of the inner edge of back plate 44. The innermost edges, or ends, of divider plates 58 are disposed in a circle concentric with the axis of the wheel.

Wheel 32 is supported for rotation in the conveyer system by rollers, such as those illustrated at 62 in FIGS. 1 and 2, against which back plate 44 rests, and rollers, such as that indicated at 64 in FIG. 2, on which annular band 36 rests adjacent the bottom of the wheel.

As is seen in FIGS. 1, 2 and 3, a pair of belts 68 extend about a major portion of the circumference of wheel 32 and are trained over a pair of pulleys 70. A motor 74 acts through a combination of belts and pulleys 76 to rotate pulleys 70, which, in turn, move belts 68 to rotate wheel 32. A drum-type pulley 80 is positioned to bear against belts 68 to tighten the belts about wheel 32, reducing slippage between the belts and the wheel.

Referring now to FIGS. 3 and 4, pipe member 54, the radially inward edges of plates 58 and the interior edge of plate 44 define a circular opening through wheel 32 which is concentric with the center of the wheel. Set within this opening is an arcuate plate shroud, or baffle means, 84 having an outer diameter which is slightly less than the inner diameter of pipe member 54 and hole 48 through back plate 44. As is seen in FIG. 4, shroud 84 extends axially through the central opening of wheel 32 from its upstream side to its downstream side. Means for supporting shroud 84 within wheel 32 has been omitted from the drawings to simplify the illustrations, however, such support means would retain shroud 84 in a stationary position while wheel 32 rotates about the shroud. Referring to FIG. 3, it will be seen that shroud 84 is positioned to close off the center opening of each pocket as it is rotated with the wheel through an arc beneath the center of the wheel, with the center opening of a pocket being opened up as it is rotated with the wheel to a point above shroud 84. A stop plate 86 is secured to and extends across the upstream end of shroud 84, partially to close off the center opening of wheel 32.

As is seen in FIGS. 1, 2 and 3, a plate 90 having the configuration shown extends laterally across flume 12 immediately adjacent the upstream side of wheel 32, is tilted downstream to match the tilt of the wheel, and is secured at its outer edges to the walls of the flume. The upper margin of plate 90 is formed in an arc having substantially the same radius as the circumference of wheel 32. Thus, as is best seen in FIG. 3, plate 90 acts as a deflector between wheel 32 and the walls of the flume to prevent articles moved by the conveyer system from being swept in and under the wheel. Plate 90 and the side walls and bottom of the flume form a catch region at the upstream side of the metering wheel in which articles in the flume may collect adjacent the bottom of wheel 32.

Explaining now the operation of the metering means thus far described, articles such as potatoes or other vegetables are fed at irregular intervals into flume 12 by trucks, such as truck 26. Liquid flowing in the system carries the vegetables submerged along the flume to the region immediately upstream of wheel 32. As the vegetables are carried along the flume they descend with the descending floor of the flume to the catch region immediately upstream from and adjacent the bottom of wheel 32. On reaching the catch region some of the vegetables flow into the pockets which are at that time positioned adjacent the bottom of the flume. With the vegetables being fed to the conveyer at irregular intervals there will often be too many to be received in the available pockets at one time. Those which do not flow into the pockets will pile up at the upstream side of the wheel and will be prevented from moving directly through the center of the wheel by stop plate 86. Shroud plate 84 will prevent vegetables received in a pocket from being moved out of the pocket through its center opening until the pocket is rotated with the wheel to bring its center openings above the shroud. It should be noted that shroud plate 84 is continuous throughout the region extending from the area in which vegetables are picked up by the pockets to the area in which they fall from the pockets. This precludes the possibility of any shearing action between the shroud and wheel members which might cut the vegetables as they are carried in the wheel.

It should be noted also that the downstream tilt of wheel 32 permits vegetables carried by the system to more nearly fill the pockets than would be possible if the wheel were vertical. Explaining further, vegetables will fill a pocket only to such point that the upstream side of a pile of vegetables in the pocket reaches its maximum angle of repose. Once this angle of repose has been reached any additional vegetables carried into the pocket will roll off the upstream side of the pile as the pocket is rotated with the wheel. The angle of repose of a pile of vegetables remain relatively constant for each type vegetable for any tilt of the wheel. But, the upstream to downstream dimension of a pile in a pocket increases as the wheel is tilted from the vertical and, thus, the volumetric quantity of the vegetables which a pocket will hold is increased on tilting of the wheel.

Assuming that motor 74 is operated in such a manner as to rotate wheel 32 in a clockwise direction as, seen in FIG. 3, the pockets adjacent the bottom of the wheel will be moved upwardly and to the left in FIG. 3. Vegetables previously moved into a pocket will remain in the pocket until such time as the center opening of that pocket is raised to a position above the left upper margin of shroud 84 seen in the broken away portion of FIG. 3. Once the center opening is above shroud 84 vegetables may tumble from the pocket toward the center of the wheel. Due to the tilt of the wheel and the conical cross section of the back plate the vegetables fall directly through hole 48 in back plate 44 into a pool of liquid on the downstream side of the wheel. It should be noted also that the peripheral cage structure of the wheel permits liquid to flow freely from the pockets as they are raised, thereby separating the liquid from the articles conveyed. This separation of the liquid from the articles conveyed would be a benefit in systems wherein the wheel would discharge articles onto a belt or shaker type conveyer, rather than into liquid on its downstream side.

The rate of flow of articles from the downstream side of the wheel is regulated by the size of the pockets in the wheel and the speed at which the wheel is rotated. No matter how many vegetables are conveyed to the upstream side of the wheel in a given period the pockets will pick up only as many as will fill the pockets as they are rotated through an arc beneath the center of the wheel. The remainder of the vegetables moved to the upstream side of the wheel must then wait for subsequent pockets to be rotated into the region near the bottom of the flume.

As the vegetables are discharged from the downstream side of the metering means at a regulated flow rate they are drawn into the intake side of pump 18 and moved through the pump and outwardly through pipe 20. A grating structure 94 extends substantially horizontally across the flume downstream from wheel 32 and acts to guide the vegetables toward the intake side of the pump. The grating structure also permits dirt, small rocks and other small nonfloating refuse to settle to the bottom of the flume on the downstream side of wheel 32 where it can be removed by a mud pump (not shown).

It should be evident that the metering means of the invention may be used with other types of conveyer systems also and need not be limited to use with a liquid-borne conveying system. For example, articles could be conveyed to the upstream side of wheel 32 by a shaker or endless belt conveyer, and articles discharged from the downstream side of the wheel could be tumbled onto a belt or shaker conveyer at the downstream side of the wheel.

The metering means described would also have application in blending apparatus for blending articles from one conveyer line with articles from a second conveyer line, with the metering means being used to maintain a desired ratio in the final blend between the articles from the two conveyer lines. This could be accomplished by using two sparate conveyer lines and two metering means discharging into a common discharge region with one metering means associated with one conveyer line and the other metering means associated with the other conveyer line. The size of the pockets in the wheels and the rotational speeds of the respective metering means would determine the quantity of articles discharged from the respective wheels. Varying the speed or pocket sizes of the wheels could produce any blend ratio desired.

When a liquid-borne conveyer slstem as previously described is used to move vegetables, such as potatoes, other articles often find their way into the system. Such other articles include leaves, vines, branches, etc., which will float on the surface of the water in the system while the vegetables will be submerged as they flow through the system. Included with the metering means in FIGS. 5 and 6 is separating means indicated generally at 100 which is adapted to separate the floating articles from the submerged articles in the system by skimming floating articles from the surface of the liquid and transporting them upwardly and away from the liquid.

Separating means 100 includes an elongated endless conveyer belt 102 which is trained over a pair of spaced-apart pulleys 104, 106. As is best seen in FIG. 5, the conveyer belt extends at an angle to the horizontal through the open center of wheel 32 with the lower end of the conveyer being positioned to extend slightly into the water on the downstream side of the wheel. As is seen in FIG. 6, a portion of stop plate 86 is cut away to allow the conveyer belt to pass therethrough. The conveyer extends through stop plate 86 and the center of wheel 32 in a region in which it will not hinder the fall of articles from the center openings of the pockets on the wheel. The conveyer belt has multiple spaced-apart fingers 110 projecting outwardly from the outer surface of the belt. An elongated trough 112 underlies and parallels the lower reach of conveyer belt 102 throughout a major portion of its length and the lower reach of the conveyer belt and fingers 110 run in the trough.

In operation, a motor 124 operatively connected to the conveyer belt is operated to move the lower reach of the conveyer belt upwardly and away from the surface of the liquid in the direction of arrow 116 in FIG. 5 and fingers 110 skim floating articles from the surface of the water. The articles skimmed from the water are drawn upwardly and along trough 112 to be discharged at the upper end of the conveyer into a receptacle 120.

While a particular embodiment of the invention has been described, it should be obvious that modifications and variations are possible without departing therefrom. It is desired to cover all such organizations of the invention as would be apparent to one skilled in the art and that come within the scope of the appended claims.

It is claimed and desired to be secured by letters patent:

1. In a conveyer system including an elongated channel along which liquid may flow to carry articles therealong and a catch region in said channel in which articles may collect, metering means for regulating the flow of such articles comprising:

a rotatable open-centered wheel disposed intermediate the ends of the channel and transversely of the channel with its axis of rotation tilted from the horizontal to position the top of the wheel further downstream than its bottom, the base of said wheel being movable through said catch region, multiple spaced-apart divider members secured to and extending radially inwardly from the periphery of the wheel with the innermost ends of said divider members disposed in a circle concentric with the axis of rotation of the wheel, said divider members defining multiple pockets annularly disposed within the wheel for picking up articles, each pocket having an opening facing toward the upstream side of the wheel and a center opening facing radially inwardly toward the center of the wheel, baffle means for closing off the center opening of each pocket as it is moved though an arc beneath the center of rotation of the wheel, said baffle means comprising a stationary arcuate shroud disposed adjacent the innermost ends of said divider members, said wheel having an opening extending through the center of its downstream side through which articles received in a pocket may fall freely from the center opening of the pocket and into liquid in the channel at the downstream side of the wheel as the pocket is raised above the axis of rotation of the wheel, and motor means for moving the wheel.

2. The conveyer system of claim 1, wherein said baffle means further comprises stop means extending across said arcuate shroud adjacent its upstream end for preventing articles moved by the conveyer system from being moved directly through the open center of the wheel in a region beneath the axis of rotation.

3. The conveyer system of claim 2, which is adapted to move such articles in a liquid flowing in the system with such articles submerged, and wherein other articles may be moved by the liquid also with such other articles floating on the surface of such liquid, and which further comprises means defining an opening through said stop means extending across the shroud and separating means comprising a power-operated elongated endless separating conveyer extending at an angle to the horizontal through the open center of the wheel and through said opening defined in the stop means, with the lower end of said separating conveyer being positioned to extend into the liquid in the system and being adapted to skim such other articles from the surface of the liquid and to transport such other articles to a station removed from such liquid.

4. The conveyer system of claim 1 which is adapted to move such articles in a liquid flowing in the system with such articles submerged and wherein other articles may be moved by the liquid also with such other articles floating on the surface of such liquid, and which further comprises separating means comprising an elongated endless separating conveyer adapted to skim such other articles from the surface of the liquid.

5. The conveyer system of claim 4, wherein said separating means further comprises means for moving the lower reach of said separating conveyer upwardly and away from the liquid in the system, multiple spaced-apart fingers projecting outwardly from the outer surface of said separating conveyer, and an elongated trough which underlies and parallels the lower reach of said separating conveyer.

6. In a conveyer system which provides a flow path along which articles may be moved in a liquid flowing in the system, metering means for regulating the flow of such articles comprising:
   a rotatable open-centered wheel disposed transversely of said flow path with its axis of rotation tilted from the horizontal to position the top of the wheel further downstream than its bottom,
   said wheel comprising a porous circumferential shell permitting passage of liquid therethrough, and multiple pockets annularly disposed within the wheel, each pocket having an opening facing the upstream side of the wheel and an opening facing radially inwardly toward the center of the wheel,
   motor means operatively connected to the wheel for rotating the wheel, and
   baffle means for closing off the center opening of each pocket as it is moved through an arc beneath the axis of rotation of the wheel.

7. The conveyer system of claim 6, wherein said shell comprises a cage structure having means therein defining openings which are smaller than articles conveyed through the system.

References Cited

UNITED STATES PATENTS

| | | | |
|---|---|---|---|
| 1,653,480 | 12/1927 | Soubier | 198—209 |
| 2,520,527 | 8/1950 | Campion | 198—211X |

EDWARD SROKA, Primary Examiner

U.S. Cl. X.R.

198—209; 210—161